(12) United States Patent  (10) Patent No.: US 8,676,445 B2
Offerle et al.  (45) Date of Patent: Mar. 18, 2014

(54) HYDRAULIC STEERING DIAGNOSTIC SYSTEM AND METHOD

(75) Inventors: Timothy Gerard Offerle, Whittaker, MI (US); Daniel K. Tuttle, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 506 days.

(21) Appl. No.: 12/767,801

(22) Filed: Apr. 27, 2010

(65) Prior Publication Data

US 2011/0264321 A1  Oct. 27, 2011

(51) Int. Cl.
*G01M 17/00* (2006.01)
*G06F 7/00* (2006.01)
*G06F 11/30* (2006.01)
*G06F 19/00* (2011.01)
*G07C 5/00* (2006.01)

(52) U.S. Cl.
USPC .............................. 701/43; 180/421; 340/608

(58) Field of Classification Search
CPC ............ G07C 5/00; G06F 11/30; G06F 7/00; G06F 19/00; G01M 17/00
USPC .................. 702/29.9, 193; 180/421; 340/608; 701/29.1
See application file for complete search history.

(56) References Cited

U.S. PATENT DOCUMENTS

| | | | | |
|---|---|---|---|---|
| 4,410,109 A | * | 10/1983 | Murrell et al. | 222/52 |
| 4,870,392 A | * | 9/1989 | Baltz et al. | 340/608 |
| 5,343,392 A | * | 8/1994 | Ishizaka et al. | 701/43 |
| 5,439,070 A | * | 8/1995 | Haga et al. | 180/421 |
| 5,960,694 A | * | 10/1999 | Thomas et al. | 91/363 R |
| 5,971,503 A | * | 10/1999 | Joyce et al. | 303/191 |
| 6,055,851 A | * | 5/2000 | Tanaka et al. | 73/46 |
| 6,067,782 A | * | 5/2000 | Diekhans | 56/10.2 A |
| 6,170,584 B1 | | 1/2001 | Mistry | |
| 6,276,763 B1 | | 8/2001 | Isono | |
| 6,286,602 B1 | * | 9/2001 | Lemetayer et al. | 166/311 |
| 6,374,940 B1 | * | 4/2002 | Pickert | 180/406 |
| 6,978,859 B2 | * | 12/2005 | Torizawa | 180/405 |
| 7,210,554 B2 | | 5/2007 | Sugiyama | |
| 8,155,823 B2 | * | 4/2012 | Itoh | 701/31.7 |
| 2005/0223706 A1 | * | 10/2005 | Mitchell et al. | 60/606 |
| 2006/0229851 A1 | * | 10/2006 | Cannon | 702/193 |
| 2009/0159360 A1 | * | 6/2009 | Kasten et al. | 180/422 |

FOREIGN PATENT DOCUMENTS

| | | |
|---|---|---|
| JP | 60080943 A | 5/1985 |
| JP | 62094442 A | 4/1987 |
| JP | 03090414 A | 4/1991 |
| KR | 3055866 A | 7/2003 |
| KR | 2004071894 A | 8/2004 |

OTHER PUBLICATIONS

Ahmadi et al., Vibration-Based Fault Diagnosis of Hydraulic Pump of Tractor Steering System by Using Energy Technique, Jun. 2009, *Modern Applied Science*, vol. 3, No. 6.

* cited by examiner

*Primary Examiner* — Fadey Jabr
*Assistant Examiner* — Paula L Schneider
(74) *Attorney, Agent, or Firm* — Raymond L. Coppiellie; Brooks Kushman P.C.

(57) ABSTRACT

The present disclosure relates to computer-implemented methods of diagnosing a vehicle hydraulic power steering system and steering diagnostic systems for executing the same. Some exemplary diagnostic systems are configured to detect a steering system condition based on an evaluation of a steering pump outlet pressure, an engine speed and/or a steering wheel position. The system sends a warning signal when a predetermined steering system condition is detected.

17 Claims, 5 Drawing Sheets

HYDRAULIC STEERING DIAGNOSTIC SYSTEM AND METHOD

TECHNICAL FIELD

The present disclosure relates to methods of diagnosing a vehicle power steering system and systems for implementing the same.

BACKGROUND

Most conventional automobiles include a power assist steering system. The power assist system can be electronically or hydraulically based. Existing systems include constant flow, variable flow, pressure control systems and electric motor-driven systems. It can be difficult to distinguish system failures (either in real time driving conditions or during stationary servicing). For example, a hydraulic power steering system may be malfunctioning due to a restriction in the fluid line, a sticking pump control valve within the system or an abnormality with the system pump. Current automotive hydraulic systems lack adequate means to detect and more importantly diagnose a system fault. Accordingly, it is difficult to identify the necessary repair.

In some automobiles the vehicle operator—through observation or indicators—is made aware that some repair is needed. The driver may notice functional degradations, excessive noise or a leakage of fluid. However, the vehicle and service centers lack a computer-based means for diagnosing the specific system failure. When this occurs permanent damage to the system may have occurred before proper diagnosis. The vehicle is taken in for repair and typically a service technician must rely on information gained from the driver by trial and error to determine the specific repair needed. Often when misdiagnosis occurs, properly functioning components are replaced and any number of return visits may be required. A better means of diagnosing system ailments is desired.

Some existing steering systems include an electronic motor that powers the hydraulic steering system. Such systems may include a processor that monitors the electric motor performance during operation. For example, U.S. Pat. No. 7,210,554 titled "Power Steering System" teaches an abnormal condition monitoring circuit that detects abnormalities in the pump motor. The abnormal condition monitoring circuit, however, is not compatible with engine driven steering systems that do not include an electric motor-driven pump. Accordingly, there exists a need for a more precise means of diagnosing system ailments in hydraulic power steering systems with or without electric pump motors.

Therefore, it is desirable to have a computer-implemented method of diagnosing a vehicle power steering system that can detect a specific steering system condition and send warning of the same. The system should be able to diagnose system ailments in hydraulic power steering systems with or without electric pump motors.

SUMMARY

The present inventions address one or more of the above-mentioned issues. Other features and/or advantages may become apparent from the description which follows.

One embodiment of the present invention involves a computer-implemented method of diagnosing a vehicle hydraulic power steering system, including: monitoring steering pump outlet pressure; monitoring engine speed; monitoring steering wheel position; detecting a steering system condition based on an evaluation of at least two of the following: a steering pump outlet pressure, an engine speed or a steering wheel position; and sending a warning signal when a predetermined steering system condition is detected.

Another exemplary embodiment relates to a steering diagnostic system, including: a pressure sensor configured to monitor a steering pump pressure; a speed sensor configured to monitor an engine speed; a position sensor configured to monitor a steering wheel position; and a control circuit linked to each sensor, the control circuit including diagnostic logic configured to determine a predetermined steering system condition based on at least two measurements. The control circuit is configured to send a warning signal when the predetermined steering system condition is detected.

One embodiment of the present invention relates to a control circuit for a steering diagnostic system, including: a processor configured to monitor a steering pump outlet pressure, engine speed and steering wheel position. The processor includes diagnostic logic configured to detect a predetermined steering system condition based on an evaluation of at least two measurements. The processor includes indication logic configured to send a warning signal when the predetermined steering system condition is detected.

One advantage of the present disclosure is that it teaches a precise means of diagnosing system ailments in hydraulic power steering systems with or without electric pump motors. The disclosed systems and method can be incorporated into the vehicle for real-time diagnostics or applied at a service center.

One advantage of some of the disclosed embodiments is that they include diagnostic logic to assess whether a hydraulic power steering system is malfunctioning due to an excessively high fluid flow rate, a restriction in the fluid line, a sticking pump control valve within the system or an abnormality with the system pump. In this manner, the diagnostic logic provides a comprehensive review and assessment of the steering system and pump performance.

Another advantage of the present teachings is that they disclose diagnostic methods and systems that result in earlier detection of failures. Redundant service trips and additional wear on system components can be avoided. Accordingly, the system significantly reduces the costs of repair.

Another advantage of the present teachings is that they disclose diagnostic methods and systems that do not require the use of a flow rate sensor. System costs can be significantly reduced by estimating flow rate based on other system conditions.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

The invention will be explained in greater detail below by way of example with reference to the figures, in which the same references numbers are used in the figures for identical or essentially identical elements. The above features and advantages and other features and advantages of the present invention are readily apparent from the following detailed description of the best modes for carrying out the invention when taken in connection with the accompanying drawings. In the figures:

Although the following detailed description makes reference to illustrative embodiments, many alternatives, modifications, and variations thereof will be apparent to those skilled in the art. Accordingly, it is intended that the claimed subject matter be viewed broadly.

DETAILED DESCRIPTION

Referring to the drawings, FIGS. 1-7, wherein like characters represent the same or corresponding parts throughout the several views there are shown exemplary methods of diagnosing a steering system and steering diagnostic systems configured to implement the same. The present teachings relate to a self diagnosing method for a vehicle hydraulic system. The disclosed hydraulic system can be implemented on a vehicle or remotely for service use only. The exemplary diagnostic systems disclosed herein are configured to identify the specific repair(s) needed by the steering system. The illustrated embodiments include diagnostic logic to assess whether a power steering system is malfunctioning due to an excessively high fluid flow rate, a restriction in the fluid line, a sticking pump control valve within the system or an abnormality with the system pump. The diagnostic logic provides a comprehensive review and assessment of the steering system and pump performance.

Figure 1:
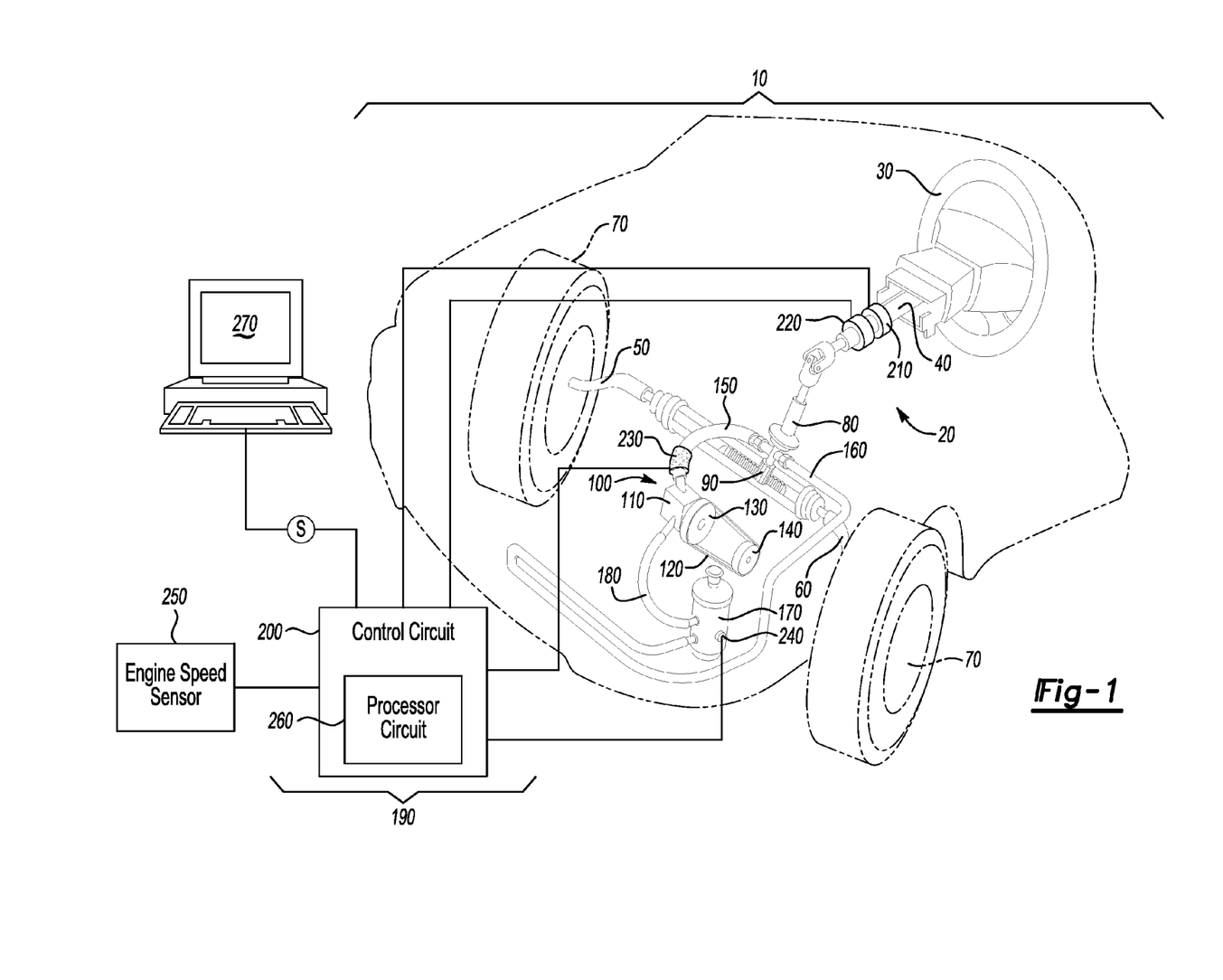
FIG. 1 is a perspective view of a power steering system with a hydraulic steering diagnostic system according to an exemplary embodiment of the present invention.

Referring now to FIG. 1, there is shown therein a perspective view of a front end of a vehicle 10 having a steering system 20. The steering system 20 includes a steering wheel 30 accessible to a vehicle operator or driver. The steering wheel 30 is configured to rotate clockwise or counterclockwise with respect to a longitudinal shaft 40 (or steering column). In the illustrated embodiment, the steering wheel 30 can rotate 720 degrees in either direction with respect to the steering column 40. The steering wheel 30 is indirectly linked to two tire rods 50, 60 that are attached to the vehicle wheels 70. In this manner, the steering wheel 30 controls the directional path of the vehicle 10. Specifically, a link 80 is provided between the steering column 40 and a pinion gear 90 placed between each tire rod 50, 60. Rotation of the steering wheel 30 is translated into linear movement of the tire rods 50, 60 which in turn pivots the wheels 70.

The steering system, as shown in FIG. 1, is fitted with a power steering assist system 100. The power steering assist 100 provides supplemental energy to the steering system 20 to reduce the work that the driver needs to exert to turn the wheels 70. The illustrated power steering assist system 20 is a hydraulic based system. A hydraulic pump 110 is in fluid communication with the link 80. The pump 110 is driven by a pulley 120 (or belt system). The driven gear 130 is attached to the pump 110, the driving gear 140 is connected to an engine crankshaft (not shown). The engine provides power to the pump 110. The pump 110 is connected to the steering system 20 through a feed line 150 (or fluid line). An exhaust line 160 runs from the steering system 20 to a reservoir 170 for recycling. An additional fluid line 180 is provided between the pump 110 and the reservoir 170 which delivers fluid to the pump. Pump 110 provides the requisite amount of pressure to the steering system 20 according to steering system needs. Pump 110 includes a plurality of control valves to control the distribution of fluid between the pump and steering system components (e.g., link 80).

The vehicle shown in FIG. 1, is configured with a steering diagnostic system 190. The diagnostic system 190 takes measurements of different system conditions and continues to monitor said conditions during vehicle operation. Based on these observations the hydraulic steering diagnostic system 190 can appropriately identify unsatisfactory system conditions and provide warning or instruction on how to repair. The system 190 includes a plurality of sensors in the vehicle that provide sensed or measured data to a central control circuit or module 200. The vehicle includes a position sensor 210 attached to the steering column 40. Position sensor 210 is configured to monitor the position of the steering wheel 30 with respect to the steering column 40. For example, if the steering wheel 30 is rotated 360 degrees with respect to the steering column 40 the position sensor 210 can measure this data and communicate it to the control circuit 200. The position sensor 210 can be, for example, be a potentiometer.

A torque sensor 220, as shown in FIG. 1, is also included in the diagnostic system 190. Torque sensor 220 is attached to the steering column 40 and configured to measure the torque or rotational energy applied to the steering wheel 30. The torque sensor 220 is configured to measure the rotation of the steering wheel 30 as well as the force applied to effectuate said rotation. The torque sensor 220 can, for example, ascertain whether the steering wheel 30 was moderately or abruptly turned and communicate this information to the control circuit 200. An exemplary torque sensor 220 can be a strain gauge torque transducer.

The pump outlet pressure is measured by a pressure sensor 230, as shown in FIG. 1. Pressure sensor 230 is in the feed line 150 between the pump 110 and the steering system 20. Pressure sensor 230 is in communication with the control circuit 200 to communicate outlet pressure readings to the control circuit. Pressure sensor 230 can be, for example, any kind of pressure gauge. Pressure sensor 230 is configured to monitor the steering pump pressure during operation. In another embodiment, the diagnostic system 190 includes a second pressure sensor (similar to 230) in the exhaust line 160 to determine the pressure therein.

A temperature sensor 240 is also provided in the diagnostic system 190 of FIG. 1. The temperature sensor 240 is anchored in the fluid reservoir 170. Temperature sensor 240 is configured to monitor the fluid temperature for the steering pump 110. Temperature sensor 240 communicates data regarding fluid temperature to the control circuit 200. Temperature sensor 240 can be an electrical thermometer, for example.

An engine speed sensor 250, as shown in FIG. 1, is also included in the diagnostic system 190. The speed sensor 250 is connected to the engine crankshaft to determine RPMs—revolutions per minute—for engine operation. The speed sensor 250 is configured to monitor the engine's speed and communicate the data to the control circuit 200.

An electronic module includes the control circuit 200 which monitors power steering pump outlet pressure and engine or pump RPMs. The control circuit 200 includes a processor 260 that compares the monitored values with predetermined (or expected) values to determine if the system 190 is functioning properly. If a parameter measures outside of normal, a code to the defect is logged into the control circuit's memory and the vehicle operator is made aware that service is required thru a warning signal. Compatible warning signals include, but are not limited to, indicator lights, chimes, verbal messages, etc. The possible warning signals can relate to a detected low fluid, air in the pump fluid, low pump relief pressure, low pump capacity, a restriction in lines or a sticking flow control valve. Other warning signals are used in different embodiments, such as e.g., ambient temperature and under-the-hood temperature. Such data can be collected and processed by the processor to further refine the steering diagnostic or fluid life indicator.

Though the control circuit 200 is shown external to the vehicle 10, in FIG. 1, the control circuit 200 can be in an external computer or incorporated into the vehicle. For example, the control circuit 200 can be a vehicle control module or restraint control module.

The diagnostic system 190, of FIG. 1, also includes a user interface 270. The user interface 270 is configured to display whether a predetermined steering system condition has been detected. The user interface 270 is configured to display such information visually through, e.g., a diagram or text message. A warning signal, "S," is sent from the processor 260 to the user interface 270. User interface 270 is a remote computer or laptop that connects with the control circuit 200 to diagnose the steering system 20. Though the shown embodiment illustrates the user interface 270 remote to the vehicle 10, the user interface can be incorporated into the vehicle. For example, the user interface 270 can be in a vehicle instrument panel, center console, overhead console or the steering wheel 30.

Figure 2:
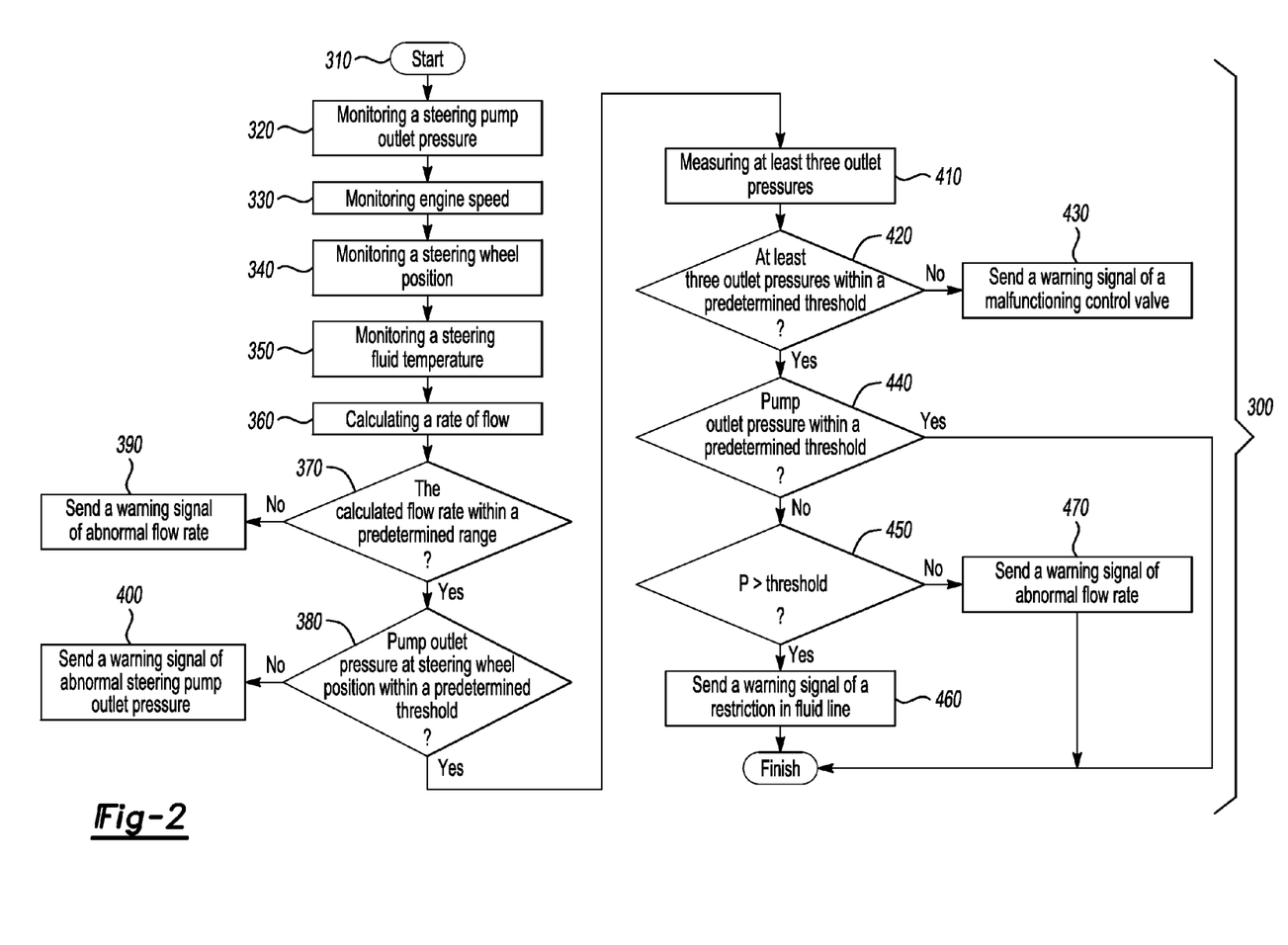
FIG. 2 illustrates a flow chart of a method of diagnosing a vehicle hydraulic power steering system according to an exemplary embodiment of the present invention.

Referring now to FIG. 2, there is shown therein a method 300 of diagnosing a vehicle power steering system. The method 300 is an algorithm that can be executed by a computer or device with processor. The algorithm 300 is executed by diagnostic logic that includes code and/or programming to enable a diagnostic system to execute at least some of the steps of the algorithm 300 shown and discussed with respect to FIG. 2. Vehicle conditions are monitored and evaluated to detect any number of predetermined steering system conditions. Where a predetermined steering system condition is determined the system is configured to issue a related warning signal to the operator.

The algorithm 300 begins at step 310 and continues with a series of monitoring steps 320, 330, 340 and 350. The system relies on the various sensors throughout the vehicle to detect a steering system condition. In the shown embodiment, the system is configured to start by monitoring the steering pump outlet pressure at 320. A pressure sensor (e.g., 230 as discussed with respect to FIG. 1) can be fitted in the feed line 150 between the pump 110 and the steering system 20. The outlet pressure for the pump can be iteratively or continuously monitored.

At step 330 the system monitors the engine speed. Engine speed can be monitored using, e.g., sensor 250 (as shown in FIG. 1) which connects to the engine crankshaft. The speed sensor 250 is configured to monitor the engine's speed and communicate the data to the control circuit. Speed sensor 250 can be configured to iteratively or continuously monitor engine speed.

Next, the system monitors steering wheel position at step 340. A torque sensor such as 220 or position sensor 210 is utilized to continuously monitor steering wheel angle. At step 350 the system monitors the temperature of the steering fluid. A sensor in the fluid reservoir, such as 240, can be utilized to monitor the temperature.

The diagnostic logic is configured to calculate a fluid flow rate (at step 360) based on measured data. Exemplary algorithms are discussed, for example, with respect to FIGS. 3 and 4. After the system estimates flow rate the calculated flow rate is compared to a predetermined range at 370. If the flow rate is within a predetermined range the algorithm continues to the next step 380. If the flow rate is outside of the set range the system sends a warning signal indicative of an abnormal flow rate to a user interface at 390.

Next, at step 380, the pump outlet pressure is compared to target values at a given steering wheel angle. An exemplary plot of steering wheel angle versus pressure is illustrated with respect to FIG. 5. Where the steering angle is measured at step 340 the pressure is also measured at step 320 and compared with a target value at step 380. If the measured pump outlet pressure 230 is outside of the target range or value, a warning signal of abnormal steering pump outlet pressure is sent to the user interface at 400. If the pressure is within the intended range, the system proceeds to step 410. At step 410 at least three pump outlet pressures are measured. Then the system compares the difference in any two of the three pressure readings to a predetermined threshold at 420. If a variation in pressure between any of the measured pressures is greater than the prescribed amount, a warning signal of a malfunctioning control valve is sent to a user interface 430. More specifically, substantial variation in the outlet pressure can be indicative of a sticky control valve. An exemplary variation in the pump outlet pressure indicative of a stick control valve can be a variation in pressure of as much as 60 psi (for example).

At step 440 the system compares the measured pump outlet pressure at a given engine speed with a predetermined threshold. Diagnostic logic is pre-programmed with an expected range of pressures at various engine speeds. The system measures the engine speed and ascertains whether the pump outlet pressure is within a predetermined range at 450. If the pressure is lower than the set threshold a warning signal is sent indicating that the power assist has an abnormal flow rate 460. If the pressure is higher than the set threshold a different warning signal is sent 470. The warning signal indicates that there is a restriction in the fluid line. The restriction can be caused, for example, by a pinch in the fluid line. Thus, the execution of the algorithm yields specific indications of system failures.

Referring now to FIGS. 3-6, there are shown therein several exemplary functions programmable into the diagnostic system to execute the aforementioned algorithm. For example, the engine speed or pump outlet pressure can be recorded versus time to give an indication of fluid condition (such as fluid flow rate) and signal if a fluid change is recommended.

Figure 3:
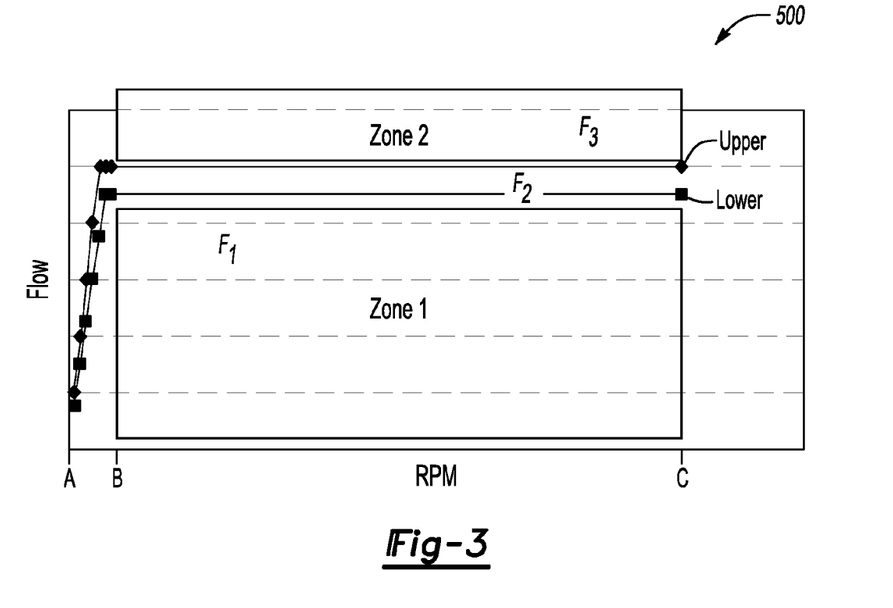
FIG. 3 illustrates a graph of a function of engine speed versus flow rate for a power steering system, the graph showing zones of abnormal performance.

Starting with FIG. 3, there is shown a function 500 of estimated fluid flow rate over engine speed. The derived flow rates are a function of engine speed, pressure and fluid temperature, i.e., in this embodiment estimated flow rate=fn(engine speed, pressure, fluid temperature). An exemplary equation for estimation of flow rate based on engine speed is as follows: flow rate=(0.004 gals/rev times engine speed)−(0.0006 gallons per minute/(psi ° F.) times pressure times temperature). The constants in the equation depend on the steering system and can be greater or lesser in value. As engine speed increases from point A (approximately zero RPMs) flow rate increases at a rate directly proportional to engine speed. After point B (approximately 1000 RPMs) the flow rate levels off, entering the controlled flow region in which the flow rate is substantially constant. The graph illustrates an upper and lower curve for flow rate. The upper limit for the upper curve for the flow rate on a 2,000 lb or less vehicle with power steering assist is 2.5 gallons per minute (or gpm). The lower limit for the lower curve for flow rate on a 2,000 lb vehicle is 2.1 gpm. The function remains fairly constant for the upper and lower limits of flow rate per engine speed from point B to point C. As shown, point C is approximately 8000 RPMs. In the illustrated diagram, three estimates of flow rate are shown based on measured data. F1 is an estimated flow rate that is lower than the programmed lower limit. F1 is in Zone 1 as shown on the graph. Any estimated flow rates in Zone 1 cue the system to send a warning signal of a predetermined steering system condition, in this case an abnormal flow rate. When a flow rate such as F1 is calculated the system sends a warning signal of an abnormal flow rate. The user interface displays or communicates an indication of either low or abnormal flow rate to an operator. F2 is an estimated flow rate that is within the programmed upper and lower limits. When such a flow rate is calculated the system does not send a warning signal. The system continues to monitor various data points and proceed to other steps in the algorithm. F3 is an estimated flow rate that is above a programmed upper limit. F3 is in Zone 2 as shown on the graph. Any estimated flow rates in Zone 2 cue the system to send a warning signal of abnormal flow rate. When a flow rate such as F3 is calculated the system sends a warning signal of an abnormal flow rate. The user interface displays or communicates an indication of either high or abnormal flow rate to an operator.

Figure 4:
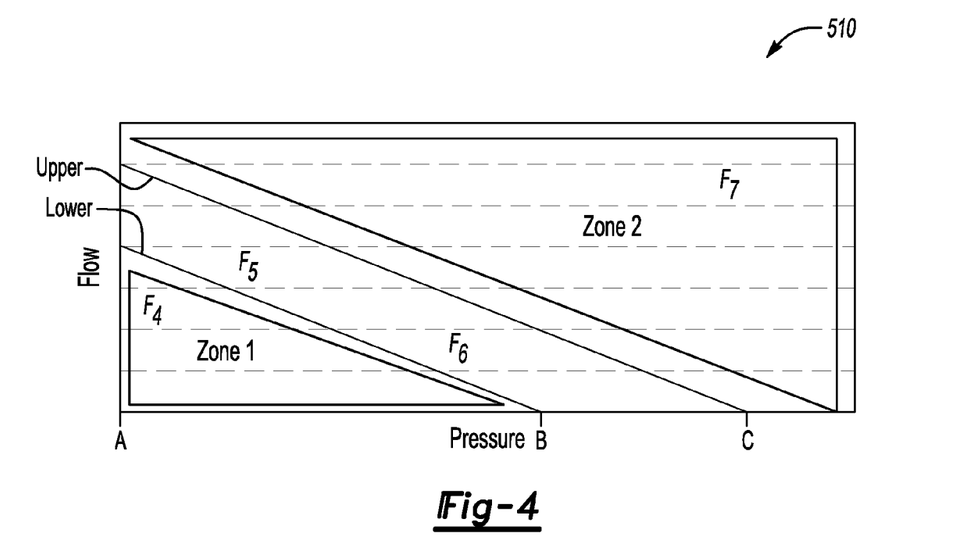
FIG. 4 illustrates a graph of a function of pressure versus flow rate for a power steering system, the graph showing zones of abnormal performance.

Referring now to FIG. 4, there is shown a function 510 of estimated fluid flow rates over pump outlet pressure. Pump outlet pressure can be measured from a pressure sensor such as 230 (discussed with respect to FIG. 1). The derived flow rate is a function of pump outlet pressure and fluid temperature, i.e., in this embodiment estimated flow rate=fn(pressure, fluid temperature). An exemplary equation for estimation of flow rate based on pump outlet pressure is as follows: flow rate=(0.004 gals/rev times engine speed)−(0.0006 gallons per minute/(psi ° F.) times pressure time temperature). As pressure increases from point A (approximately zero psi) flow rate decreases at a rate indirectly proportional to pressure. At point B (approximately 1500 psi) the flow rate levels off at or around zero cm$^3$/second. The graph illustrates an upper and lower curve for flow rate. The upper limit for the upper curve for flow rate on a 2,000 lb or less vehicle with power steering assist that starts at 2.5 gpm when pressure is zero and levels off to approximately zero cm$^3$/second when pressure is at point C (approximately 2000 psi). The lower limit for the lower curve for flow rate on a 2,000 lb vehicle starts at 2.1 gpm when pressure is zero and levels off to approximately zero cm$^3$/second when pressure is at point B (approximately 1500 psi). The slope of the function remains fairly constant for the upper and lower limits of flow rate per pressure.

In the illustrated diagram of FIG. 4, four estimates of flow rate are shown based on measured data. F4 is an estimated flow rate that is lower than the programmed lower limit. F4 is in Zone 1 as shown on the graph. Any estimated flow rates in Zone 1 cue the system to send a warning signal of abnormal flow rate. When a flow rate such as F4 is calculated the system sends a warning signal of a predetermined steering system condition, in this case an abnormal flow rate. The user interface displays or communicates an indication of either low or abnormal flow rate to an operator. F5 and F6 are estimated flow rates that are within the programmed upper and lower limits. When such flow rates are calculated the system does not send a warning signal. The system continues to monitor various data points and proceed to other steps in the algorithm. F7 is an estimated flow rate that is above the programmed upper limit. F7 is in Zone 2 as shown on the graph. Any estimated flow rates in Zone 2 cue the system to send a warning signal of abnormal flow rate. When a flow rate such as F7 is calculated the system sends a warning signal of an abnormal flow rate. The user interface displays or communicates an indication of either high or abnormal flow rate to an operator.

Though the exemplary target flow rates in the functions expressed through FIGS. 3 and 4 are discussed with respect to a 2,000 lb or less vehicle, the programmed functions 500 and 510 can have application for vehicles of greater size. Other functions can be downloaded into the processor to instruct of different target flow rates for other vehicles or vehicles of similar size. The upper and lower limits can vary in magnitude and/or profile. For example, the predetermined flow rates may not be substantially constant with respect to higher engine speeds as discussed with respect to FIG. 3. The predetermined flow rate can be, for example, directly proportional to engine speed at all speed data points in the function. Or, in another example, the flow rate need not necessarily be indirectly related to pressure at all pressure data points in the function. The assigned limits for the flow rate can be constant for some period in the function or exponentially related to pressure.

Figure 5:
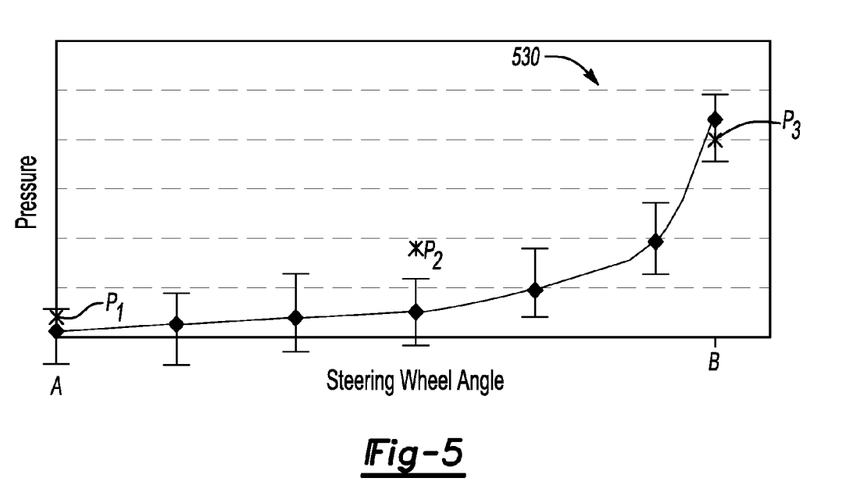
FIG. 5 illustrates a graph of a function of steering wheel angle versus pressure for a power steering system, the graph showing error margins for normal system performance.

Referring now to FIG. 5, there is shown therein a function 530 of predetermined pump outlet pressures per a measured steering wheel angle. Steering wheel angle can be measured from a position sensor such as 210 (discussed with respect to FIG. 1). Steering wheel angle can also be estimated from a torque sensor such as 220 (as also discussed with respect to FIG. 1). The predetermined pump outlet pressures, as shown in FIG. 5, are a function of steering wheel angle, i.e., in this embodiment estimated predetermined pump outlet pressure=fn(steering wheel angle). There is an exponential relationship between the steering wheel angle and estimated pump outlet pressure. As the turn of the steering wheel angle increases from point A (approximately zero degrees) the estimated outlet pressure increases at an increasing rate. At point A the estimated power assist pressure for a 2,000 lb or less vehicle is zero psi. An error margin is shown with respect to each pressure estimate. At point A the range of error or deviation from the estimated pressure is +/−10 psi. At point B, where the steering wheel has been turned approximately 720 degrees from the longitudinal axis of the steering column, the predetermined outlet pressure is significantly higher at 1500 psi. An error margin is shown with respect to the pressure estimate at point B. At point B the range of error or deviation is asymmetrical varying, from +100 psi (in excess of the target pressure) to −150 psi (below the target pressure).

In the illustrated diagram of FIG. 5, three measured outlet pressures are stored in the system processor. P1 is a measured pressure taken at a steering wheel angle of zero degrees. P1 is equal to 5 psi; though the pressure is higher than the predetermined pressure at that angle P1, the pressure is still within an acceptable margin of error. The system does not issue a warning signal when a pressure such as P1 is sensed. Any measured pump outlet pressures outside of the margin of error for each steering wheel angle cues the system to send a warning signal of an abnormal pump outlet pressure.

For example, as shown in FIG. 5, P2 is a measured pressure taken at a steering wheel angle of 360 degrees. P2 is equal to approximately 500 psi. The predetermined pressure at that angle is 200 psi. The acceptable margin of error at a steering wheel angle of 360 degrees +/−50 psi. Since P2 is outside of the margin of error at this angle, the system sends a warning signal to the user interface of an abnormal pump outlet pressure. Any measured pump outlet pressures outside of the margin of error for each a given steering wheel angle (e.g., P2) cues the system to send a warning signal of a predetermined steering system condition, in this case a abnormal pump outlet pressure.

A measured pump outlet pressure can also be less than the predetermined pressure. For example, as shown in FIG. 5, P3 is a measured pressure taken at a steering wheel angle of 720 degrees. P3 is equal to approximately 1400 psi. The predetermined pressure at that angle is 1500 psi. The acceptable margin of error at a steering wheel angle of 720 degrees is +/−150 psi. Since P3 is inside the margin of error at this angle, the system does not need to send a warning signal of a predetermined steering system condition, in this case an abnormal pump pressure. Any measured pump outlet pressures outside of the margin of error however will cue a warning signal from the system.

Though the exemplary pressure targets and measurements are discussed with respect to a 2,000 lb or less vehicle, the programmed function can have application for vehicles of greater size. Additional functions can be downloaded into the processor software to instruct of different pressure targets for other vehicles or similar vehicles. For example, the steering wheel angle may be configured to make three revolutions, in which case the programmed function for steering wheel angle can range from zero degrees to 1080 degrees. The target pressure ranges can also vary to greater or lesser magnitudes. It can be the case that the margins of error for any one of the predetermined pressures is asymmetrical allotting for a different excess in pressure than deficiency in any give pressure before a warning signal is issued by the system.

Figure 6:
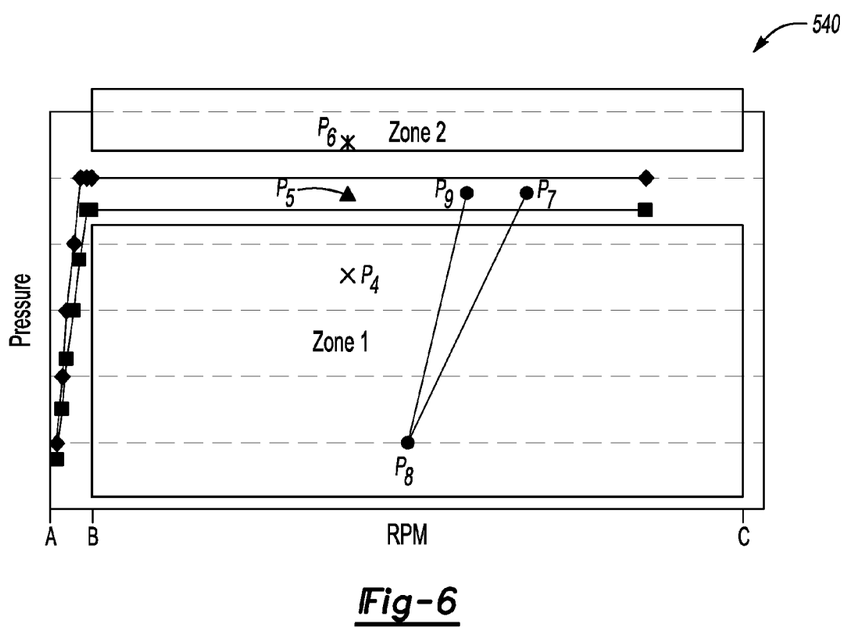
FIG. 6 illustrates a graph of a function of engine speed versus pressure for a hydraulic power steering system, the graph showing zones of abnormal performance.

Referring now to FIG. 6, there is shown therein a function 540 estimating pump outlet pressure over engine speed. The pressures are measured by a system sensor, e.g., 230 as discussed with respect to FIG. 1. As engine speed increases from point A (approximately zero RPMs) pressure increases at a rate directly proportional to engine speed. After point B (approximately 1000 RPMs) the pressure levels off. The graph illustrates an upper and lower curve for pump outlet pressure. The upper limit for the upper curve for flow rate on a 2,000 lb or less vehicle with power steering assist is 100 psi. The lower limit for the lower curve for flow rate on a 2,000 lb vehicle is 90 psi. The function remains fairly constant for the upper and lower limits of pressure per the engine speed from point B to point C. As shown, point C is approximately 9000 RPMs (the maximum engine speed for this exemplary powertrain).

In the illustrated diagram of FIG. 6, several measured data points for pump outlet pressure are shown. P4 is a measured outlet pressure that is lower than the programmed lower limit. P4 is in Zone 1 as shown on the graph. Any measured pressure readings in Zone 1 cue the system to send a warning signal of abnormal rate of flow (e.g., as shown at step 470 in the algorithm of FIG. 2). When a flow rate such as P4 is measured the system sends a warning signal of a predetermined steering system condition, in this case an abnormal flow rate. The user interface displays or communicates an indication of either low or abnormal flow rate to an operator.

P5, as shown in FIG. 6, is a different pressure reading that is within the programmed upper and lower system limits. When such a pressure is sensed the system does not send a warning signal. The system continues to monitor various data points and proceed to other steps in the algorithm. For example, where an outlet pressure that is above the upper limit is measured a warning signal is sent by the system. P6 is a measured pressure that is above the programmed upper limit. P6 is in Zone 2 as shown on the graph. Any measured outlet pressures in Zone 2 cue the system to send a warning signal of a predetermined steering system condition, in this case a restriction in the fluid line (e.g., as shown at step 460 in the algorithm of FIG. 2), to a user interface. The user interface displays or communicates an indication of the restriction to an operator.

The function of FIG. 6 is also configured to detect a malfunctioning or (what is commonly referred to as a "sticking") control valve. The control valve can constrict fluid distribution at an unintended period in system functioning. P7, P8 and P9 are different pressure readings taken at various engine speeds. P7 and P9 are approximately equal to 95 psi. As shown in this example, P8 is a significantly lower pressure than P7 and P9. P8 is approximately 20 psi. The difference in readings is compared to a predetermined amount or threshold. Where the difference between any one of the three monitored pressure readings is greater than the predetermined amount the system is cued to send a warning signal to the user interface. An exemplary predetermined amount for allowable variation is 50 psi. When pressure readings vary to a larger extent than the predetermined amount a warning signal of a predetermined steering system condition, in this case a sticking pump control valve, is sent to the user interface.

Though the exemplary pressures in the function 540 expressed in FIG. 6 are discussed with respect to a 2,000 lb or less vehicle, the programmed functions can have application for vehicles of greater size. Other functions can be downloaded into the processor to instruct of different target pressures for other vehicles or vehicles of similar size. The upper and lower limits can vary in magnitude and/or profile. For example, the predetermined pressures may not be substantially constant with respect to higher engine speeds. The predetermined pressures can be, for example, directly proportional to engine speed at all speed data points in the function.

Figure 7:
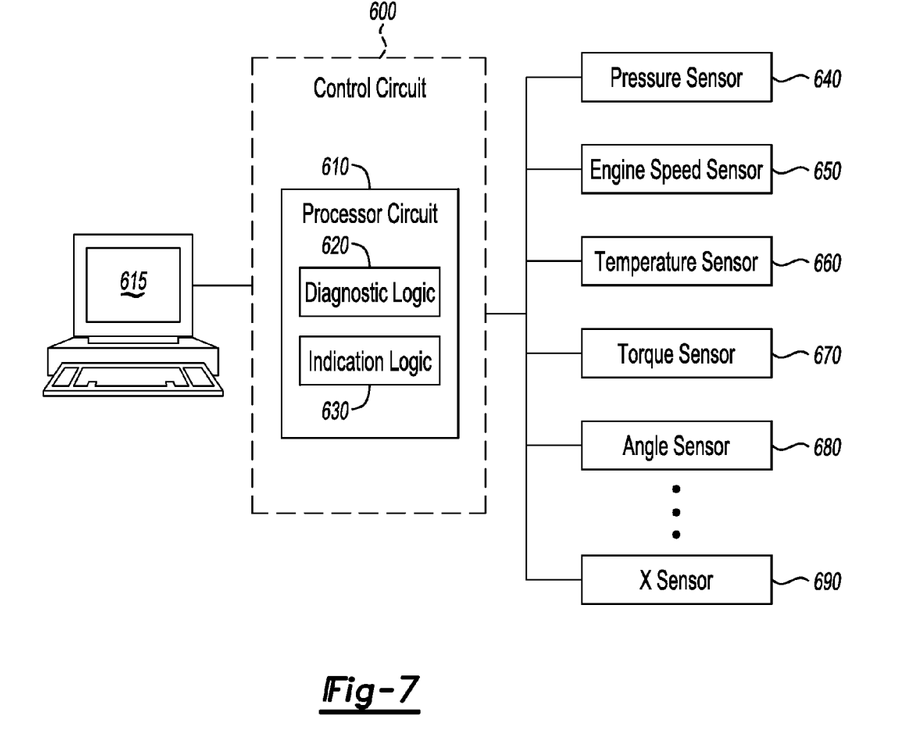
FIG. 7 illustrates a control circuit for a hydraulic steering diagnostic system according to another exemplary embodiment of the present invention.

FIG. 7 illustrates a control circuit 600 for a hydraulic steering diagnostic system according to another exemplary embodiment. Control circuit 600 includes any type of processor with software configured to execute at least some of the steps of an algorithm to detect a predetermined steering system condition. Where a predetermined steering system condition is determined the system is configured to issue a related warning signal to the operator.

A processor 610, as shown in FIG. 7, is included in the control circuit 600. Control circuit 600 is linked to a plurality of sensors. Processor 610 is configured to monitor data received or measured by the sensors. Processor 610 can be included in the existing vehicle architecture, e.g., a vehicle control module or restraint control module. Processor 610 can also be remotely located with respect to the vehicle. For example, where a user interface 615 is a personal computer as shown, processor can be incorporated into the hard drive of that computer. Processor 610 includes various software programs to enable a hydraulic steering diagnostic system to make determinations of predetermined steering system conditions and send warning signals where said conditions are detected.

In the shown embodiment of FIG. 7, processor 610 includes diagnostic logic 620. Diagnostic logic 620 includes code and/or programs that enable the system to monitor vehicle conditions and detect predetermined steering system conditions. An exemplary algorithm 300 is shown and discussed with respect to FIG. 2. Processor 610, as shown in FIG. 7, further includes indication logic 630 configured to send warning signals of any predetermined steering system conditions detected. Exemplary warning signals can relate to an excessively high fluid flow rate, a restriction in the fluid line, a sticking pump control valve within the system or an abnormality with the system pump. Indication logic 630 is compatible with the system's user interface and is configured to send at least one signal thereto identifying the prescribed system ailment. Indication logic 630 can be configured to provide audio and/or visual signals of system failures.

The processor 610 is linked to a plurality of sensors, as shown in FIG. 7. The diagnostic system includes a pressure sensor 640, engine speed sensor 650, fluid temperature sensor 660, torque sensor 670, position or angle sensor 680 and any other number of variable sensors (e.g., X sensor 690). Exemplary sensors compatible with the processor are also shown and discussed with respect to FIG. 1 as well. X sensor 690, as shown in FIG. 7, can be any number of different sensors. In one embodiment, X sensor 690 is a flow rate sensor configured to measure the rate of steering fluid flow within the system. In another embodiment, X sensor 690 is an additional pressure sensor configured in the exhaust line of the steering system. Additional exemplary sensors include a vehicle speed sensor, yaw rate sensor, lateral acceleration sensor, wheel speed sensor and steering fluid flow sensor. Any of the sensors can be connected to the processor wirelessly and/or via hardwired connections. Bluetooth technology, configured to enable short-range communication between electronic devices, is utilized to enable the components to communicate with the control circuit 600 wirelessly. Other wireless standards or technologies can be used with the control circuit such as infrared systems, RF systems, IEEE standard 802.11 and other communications platforms.

It will be apparent to those skilled in the art that various modifications and variations can be made to the methodologies of the present invention without departing from the scope of its teachings. Other embodiments of the invention will be apparent to those skilled in the art from consideration of the specification and practice of the teachings disclosed herein. It is intended that the specification and examples be considered as exemplary only.

While the best modes for carrying out the invention have been described in detail, those familiar with the art to which this invention relates will recognize various alternative designs and embodiments for practicing the invention within the scope of the appended claims.

We claim:

1. A vehicle system comprising:
   at least one control circuit configured to:
   receive a pressure signal indicating a sensed steering pump pressure from a first sensor;
   receive a temperature signal indicating a sensed steering fluid temperature from a second sensor;
   calculate a flow rate based on the pressure and temperature signals;
   compare the flow rate to a predetermined range; and
   output a warning signal if the flow rate is outside of the predetermined range.

2. The vehicle of claim 1 wherein the warning signal is indicative of an abnormal flow rate.

3. The vehicle of claim 1 wherein the at least one control circuit is further configured to receive an engine speed signal indicating a sensed engine speed from a third sensor.

4. The vehicle of claim 3 wherein the control circuit is further configured to calculated the flow rate based on the pressure, temperature and engine speed signals.

5. The vehicle of claim 3 wherein the predetermined range is a function of engine speed.

6. The vehicle of claim 1 wherein the predetermined range is a function of steering pump pressure.

7. The vehicle of claim 1 wherein the warning is indicative of a sticking control valve.

8. The vehicle of claim 1 wherein the warning signal is output to a user interface.

9. A hydraulic power steering system comprising:
   a first sensor outputting a pressure signal indicative of a sensed steering pump pressure;
   a second sensor outputting a position signal indicative of a sensed steering wheel position; and
   at least one control circuit in communication with the first and second sensors and configured to:
   receive the pressure signal and the position signal;
   determine a measured steering pump pressure from the pressure signal;
   determine a normal steering pump pressure range using the position signal; and
   output a warning signal if the measured steering pump pressure is outside of the normal pressure range.

10. The hydraulic power steering system of claim 9 wherein the at least one control circuit is further configured to:
    determine at least three consecutive measured steering pump pressures; and
    compare the at least three measured steering pump pressures to each other;
    wherein the warning signal further comprises a malfunctioning control valve warning signal if comparison of any two of the at least three measured steering pump pressures have greater variance than a predetermined threshold.

11. The hydraulic power steering system of claim 9 wherein the warning signal further comprises a restricted fluid line warning signal if the measured steering pump pressure is above the normal range.

12. The hydraulic power steering system of claim 9 wherein the warning signal further comprises an abnormal flow rate warning signal if the measured steering pump pressure is below the normal range.

13. A power steering system for a vehicle comprising:
    a first sensor configured to output a pressure signal indicative of a sensed steering pump pressure;
    a second sensor configured to output a speed signal indicative of a sensed engine speed; and
    at least one control circuit in communication with first and second sensors and configured to:
    receive the pressure signal and the speed signal;
    determine a measured steering pump pressure from the pressure signal;
    determine a normal steering pump pressure range using the speed signal; and
    output a warning signal if the measured steering pump pressure is outside of the normal pressure range.

14. The hydraulic power steering system of claim 13 wherein the at least one control circuit is further configured to:
    determine at least three consecutive measured steering pump pressures; and
    compare the at least three measured steering pump pressures to each other;
    wherein the warning signal further comprises a malfunctioning control valve warning signal if comparison of any two of the at least three measured steering pump pressures have greater variance than a predetermined threshold.

15. The hydraulic power steering system of claim 13 wherein the at least one controller is further configured to output the warning signal to a user interface.

16. The hydraulic power steering system of claim 13 wherein the warning signal further comprises a restricted fluid line warning signal if the measured steering pump pressure is above the normal range.

17. The hydraulic power steering system of claim 13 wherein the warning signal further comprises an abnormal flow rate warning signal if the measured steering pump pressure is below the normal range.

* * * * *